United States Patent
Coteus et al.

(10) Patent No.: US 9,817,697 B2
(45) Date of Patent: Nov. 14, 2017

(54) THERMAL- AND SPATIAL-AWARE TASK SCHEDULING

(71) Applicant: International Business Machines Corporation, Armonk, NY (US)

(72) Inventors: Paul W. Coteus, Yorktown, NY (US); Eun Kyung Lee, Elmsford, NY (US); Yoonho Park, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/080,689

(22) Filed: Mar. 25, 2016

(65) Prior Publication Data

US 2017/0277564 A1  Sep. 28, 2017

(51) Int. Cl.
| | |
|---|---|
| *G06F 9/46* | (2006.01) |
| *G06F 9/48* | (2006.01) |
| *G06F 9/50* | (2006.01) |

(52) U.S. Cl.
CPC .......... *G06F 9/4893* (2013.01); *G06F 9/5094* (2013.01)

(58) Field of Classification Search
None
See application file for complete search history.

(56) References Cited

U.S. PATENT DOCUMENTS

| 6,000,036 A | 12/1999 | Durham et al. |
|---|---|---|
| 7,330,983 B2 | 2/2008 | Chaparro et al. |
| 7,886,172 B2 | 2/2011 | Bose et al. |
| 2005/0278520 A1 | 12/2005 | Hirai et al. |
| 2007/0143763 A1* | 6/2007 | Adachi .................. G06F 1/206 718/104 |
| 2008/0134191 A1* | 6/2008 | Warrier ................. G06F 9/5077 718/104 |
| 2009/0064164 A1* | 3/2009 | Bose ....................... G06F 1/206 718/105 |
| 2009/0271141 A1* | 10/2009 | Coskun .................. G06F 1/206 702/132 |
| 2012/0271481 A1* | 10/2012 | Anderson .............. G06F 1/206 700/299 |

(Continued)

OTHER PUBLICATIONS

Floyd, M.S., et al., "Runtime power reduction capability of the IBM POWER7+chip", IBM Journal of Research and Development, vol. 57, No. 6, Nov.-Dec. 2013, copyright 2013 IBM, pp. 2:1-2:17.

(Continued)

*Primary Examiner* — Dong Kim
(74) *Attorney, Agent, or Firm* — Harrington & Smith; Daniel Morris

(57) ABSTRACT

A method, apparatus, and computer program product are provided for thermal- and spatial-aware task scheduling. The method may include monitoring a temperature for each core of a central processing unit having a plurality of cores; determining, from the monitoring, a set of hotspot cores from the plurality of cores determining temperature information and distance information for each hotspot core in the set of hotspot cores relative to each of the other cores on the central processing unit; calculating a placement metric for each core of the central processing unit based at least on the determined distance information and the determined temperature information; and scheduling a task by allocating the task to one or more cores of the central processing unit according to the placement metric.

18 Claims, 8 Drawing Sheets

(56) References Cited

U.S. PATENT DOCUMENTS

| | | | |
|---|---|---|---|
| 2013/0079946 A1* | 3/2013 | Anderson | G06F 1/3228 700/299 |
| 2014/0059556 A1 | 2/2014 | Barsness et al. | |
| 2014/0298344 A1 | 10/2014 | Hsiao et al. | |
| 2014/0344827 A1* | 11/2014 | Mavila | G06F 9/4893 718/104 |

OTHER PUBLICATIONS

Xia, L., et al., "Implementing a Thermal-Aware Scheduler in Linux Kernel on a Multi-core Processor", The Computer Journal, vol. 53, No. 7, 2010, pp. 895-903.

Yeo, I., et al., "Temperature-aware scheduler based on thermal behavior grouping in multicore systems", Design, Automation & Test in Europe Conference & Exhibition, Apr. 2009, 3 pgs., abstract only.

Chantem, T., et al., "Temperture-Aware Scheduling and Assignment for Hard Real-Time Applications on MPSoCs", Design, Automation and Test in Europe, Mar. 10-14, 2008, 14 pgs.

Coskun, K., et al., "Static and dynamic Temperature-Aware Scheduling for Multiprocessor SoCs", IEEE Transactions on Very Large Scale Integration (VLSI) Systems, vol. 16, No. 9, Sep. 2008, pp. 1127-1140.

Liu, S., et al., "Thermal-aware job allocation and scheduling for three dimensional chip multiprocessor", Quality Electronic Design (SQED), Mar. 22-24, 2010, 8 pgs.

Choi, J, et al., "Theremal-aware Task Scheduling at the System Software Level", copyright 2007, ISLPED '07, Aug. 27-29, 2007, pp. 213-218.

\* cited by examiner

| Core Number | Temp. Diff. Vector (T) [°F] | Distance Vector (D) [mm] |
|---|---|---|
| Core 1 | 10 | 5.67 |
| Core 2 | 10 | 4 |
| Core 3 | 5 | 5.67 |
| Core 4 | 5 | 8.94 |
| Core 5 | 5 | 4 |
| Hotspot → Core 6 | 0 | 0 |
| Core 7 | 5 | 4 |
| Core 8 | 10 | 8 |
| Core 9 | 5 | 5.67 |
| Core 10 | 5 | 4 |
| Core 11 | 5 | 5.67 |
| Core 12 | 5 | 8.94 |
| Core 13 | 5 | 8.94 |
| Core 14 | 5 | 8 |
| Core 15 | 10 | 8.94 |
| Core 16 | 10 | 11.31 |

Fig. 6

THERMAL- AND SPATIAL-AWARE TASK SCHEDULING

BACKGROUND

This invention relates generally to task scheduling and, more specifically, relates to thermal- and spatial-aware task scheduling.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The increasing demand for faster computing has resulted in an increase in central processing unit (CPU) power density and heat generation. The cooling cost for removing the heat also increases at the same rate as power density and heat generation. The heat generated by a core is mainly transferred through conduction to a heat-sink or other cooling means, usually attached to the backside of the CPU chip. As the heat from the core travels through the body of the semiconductor to the backside of the chip where the heat is removed, it also spreads outwards in the plane of the body. As a result, the thermal image of the core at the heat-sink is enlarged. Adjacent cores may have overlapped images which results in an increase in the maximum die temperatures. This in turn may degrade the performance and lifetime of the CPU.

SUMMARY

According to an embodiment described herein a method is provided. The method includes monitoring a temperature for each core of a central processing unit having a plurality of cores; determining, from the monitoring, a set of hotspot cores from the plurality of cores; determining temperature information and distance information for each hotspot core in the set of hotspot cores relative to each of the other cores on the central processing unit; calculating a placement metric for each core of the central processing unit based at least on the determined distance information and the determined temperature information; and scheduling a task by allocating the task to one or more cores of the central processing unit according to the placement metric.

According to another embodiment described herein an apparatus is provided. The apparatus comprises at least one processor; and at least one non-transitory memory including computer program code. The at least one memory and the computer program code are configured to, with the at least one processor, cause the apparatus to monitor a temperature for each core of a central processing unit having a plurality of cores; determine, from the monitoring, a set of hotspot cores from the plurality of cores; determine temperature information and distance information for each respective hotspot core in the set of hotspot cores relative to each of the other cores on the central processing unit; calculate a placement metric for each core of the central processing unit based at least on the determined distance information and the determined temperature information; and schedule a task by allocating the task to one or more cores of the central processing unit according to the placement metric.

According to another embodiment described herein a computer program product is provided. The computer program product comprises a computer readable storage medium having program instructions embodied therewith. The program instructions are executable by a device to cause the device to: monitor a temperature for each core of a central processing unit having a plurality of cores; determine, from the monitoring, a set of hotspot cores from the plurality of cores; determine temperature information and distance information for each respective hotspot core in the set of hotspot cores relative to each of the other cores on the central processing unit; calculate a placement metric for each core of the central processing unit based at least on the determined distance information and the determined temperature information; and schedule a task by allocating the task to one or more cores of the central processing unit according to the placement metric.

BRIEF DESCRIPTION OF THE DRAWINGS

These and other features, aspects, and advantages of the present invention will become better understood with regard to the following description, appended claims, and accompanying drawings, where:

FIG. 6 is a table showing example temperature information and distance information according to exemplary embodiments;

DETAILED DESCRIPTION

In the Summary above and in the Detailed Description and the claims below, and in the accompanying drawings, reference is made to particular features (including method steps) of the invention. It is to be understood that these various features may be combined despite that the description herein does not explore explicitly every single such possible combination. The specific embodiments that are detailed with particularity herein are not a limit to the general teachings herein, and such exemplary embodiments by themselves are not a limit to the scope of the ensuing claims but rather teach the principles of the invention and illuminate the meaning of such ensuing claims.

The exemplary embodiments herein describe techniques for thermal-aware and spatial-aware task scheduling. One objective of the scheduling techniques described herein is to minimize the maximum temperature of cores on a central processing unit. Additional description of these techniques is presented after a system into which the exemplary embodiments may be used is described.

As referred to herein, a hotspot core is a single core on a central processing unit which, for example, may be the hottest core, a core hotter than adjacent cores, or cores hotter than some predefined threshold temperature (e.g. a user-defined threshold temperature). A set of hotspot cores is a group of these hotspot cores.

Figure 1:
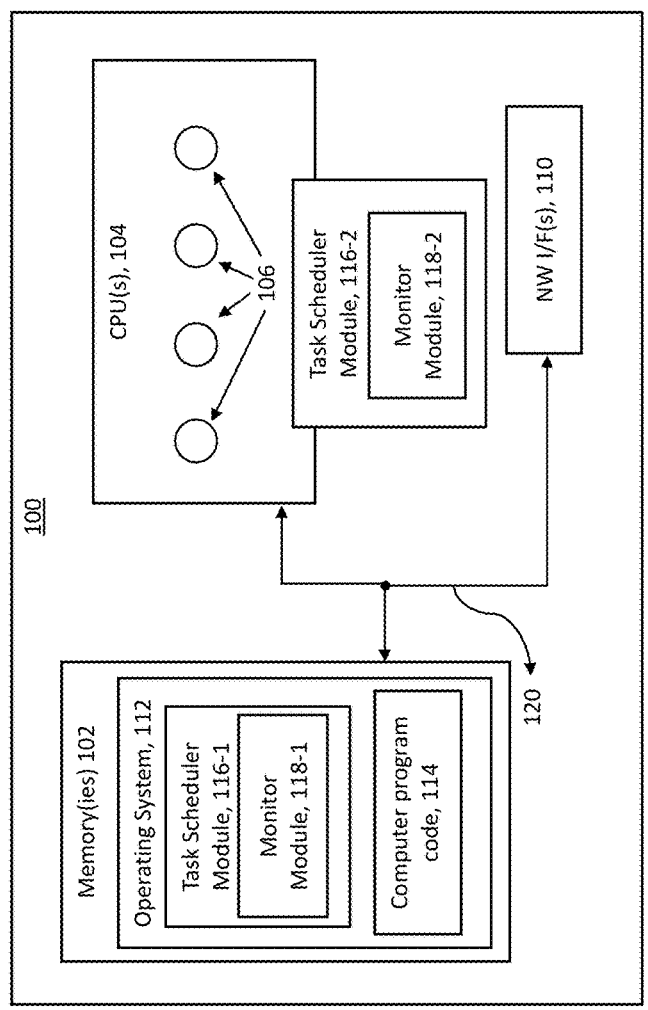
FIG. 1 is a block diagram of one possible and non-limiting exemplary system in which the exemplary embodiments may be practiced.

Referring to FIG. 1, this figure shows a block diagram of one possible and non-limiting exemplary computer system 100 in which exemplary embodiments may be practiced. In FIG. 1, the computer system 100 includes one more memories 102, one or more CPUs 104, and one or more network interfaces (N/W I/F(s)) 110, interconnected through one or more buses 120. The one or more buses 120 may be address, data, or control buses, and may include any interconnection mechanism, such as a series of lines on a motherboard or integrated circuit, fiber optics or other optical communication equipment, and the like. The one or more CPUs 104 includes multiple cores 106, which also may be referred to as processing units. Although not shown in FIG. 1, each core 106 includes one or more temperature sensors, which measure and indicate the temperature of the core. FIG. 1 shows four cores, however it should be appreciated that the one or more CPUs 104 may include a larger or smaller number of cores 106.

The one or more memories 102 include an operating system 112 operable to execute computer program code 114. The computing system 100 includes a task scheduler module 116, comprising one of or both parts 116-1 and/or 116-2, which may be implemented in a number of ways. The computer system 100 may also include a monitor module 118, comprising one of or both parts 118-1 and/or 118-2. The task scheduler module 116 may be implemented in hardware as task scheduler module 116-2, such as being implemented as part of the one or more CPUs 104. The task scheduler module 116-2 may be implemented also as an integrated circuit or through other hardware such as a programmable gate array. In another example, the task scheduler module 116 may be implemented as task scheduler module 116-1, which is implemented as computer program code and is executed by the one or more CPUs 104. The monitor module 118 may be implemented in hardware as monitor module 118-2, such as being implemented as part of the one or more CPUs 104. The monitor module 118-2 may be implemented also as an integrated circuit or through other hardware such as a programmable gate array. In another example, the monitor module 118 may be implemented as monitor module 118-1, which is implemented as computer program code and is executed by the one or more CPUs 104. For instance, the one or more memories 102 and the computer program code 114 may be configured to, with the one or more processors 104, cause the computer system 100 to perform one or more of the operations as described herein. The one or more network interfaces 110 may communicate over a network such as a wireless or wired network.

As stated in the background above, heat generation of multicore CPUs may degrade the performance and lifetime of the CPU. The algorithm for how tasks are placed on the CPU may affect the amount of heat that is generated. Embodiments described herein inherently minimize the maximum temperature of cores of a central processing unit. Exemplary embodiments described herein are directed to scheduling tasks based upon the temperature and physical distance among the cores in order to distribute heat, and to reduce the impact of heat conduction on the CPU.

Figure 2:
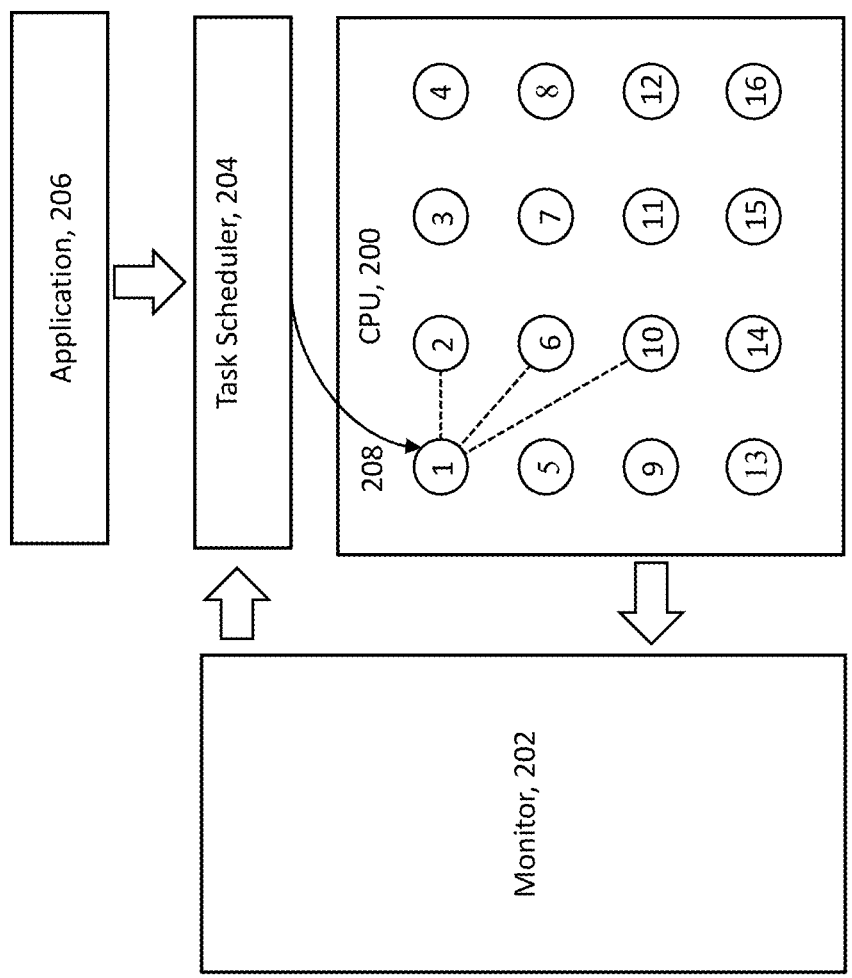
FIG. 2 is a process flow diagram according to exemplary embodiments.

Referring now to FIG. 2, this figure shows a flow diagram showing the interaction between a CPU 200 (e.g. CPU 104 of FIG. 1), a monitor 202 (e.g. the monitor module 118), a task scheduler 204 (e.g. task scheduler module 116), and an application 206 (e.g. the computer program code 114) according to exemplary embodiments. The CPU 200 shown in FIG. 2 comprises sixteen different cores which are labeled 1-16. Each core of CPU 200 includes one or more temperature sensors to measure the core's temperature. For example, the computer architecture may determine how to use the one or more temperature sensors (e.g., max, average, etc.) to represent the core temperature. The monitor 202 receives each of the core's temperatures and synchronizes the temperature values and reports the synchronized values to the task scheduler 204. For example, the temperature of different cores may be reported at different times, and thus the monitor synchronizes the temperatures to account for this difference. The monitor 202 may synchronize the temperature in a variety of ways, including but not limited to: averaging core temperature measurements over a period of time, determining a peak temperature, etc. Based on the core temperature values fed from the monitor 202, the task scheduler 204 calculates customized metrics for each core, which includes temperature and distance information. The distance information indicates the distance between a given core and other respective core of the CPU 200. The dotted lines in FIG. 2 show the distances between core 1 and cores 2, 6, 10; however it should be understood that the distance information may include other distances, such as the distances between core 1 and each of the other cores. The task scheduler 204 places a new task, on one or more cores of the CPU 200 based on the customized metrics (also referred to herein as a 'placement metric'). The placement of a task of an application 206 on the CPU 200 is indicated by arrow 208.

Figure 3:
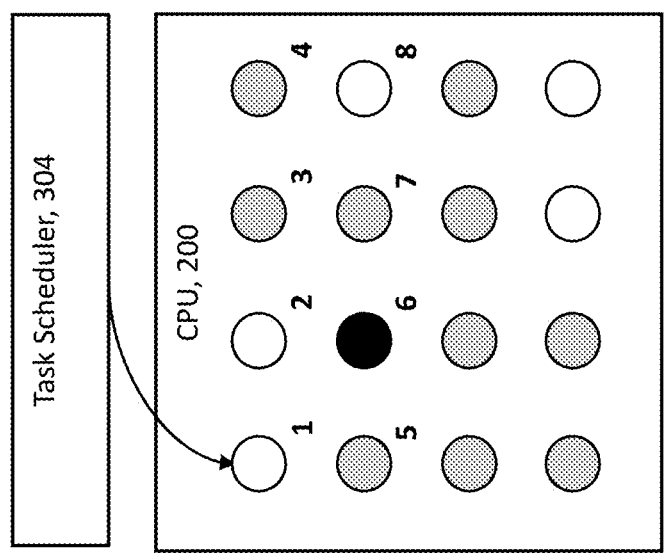
FIG. 3 illustrates an example of non-thermal-aware and non-spatial task placement.
Figure 4:
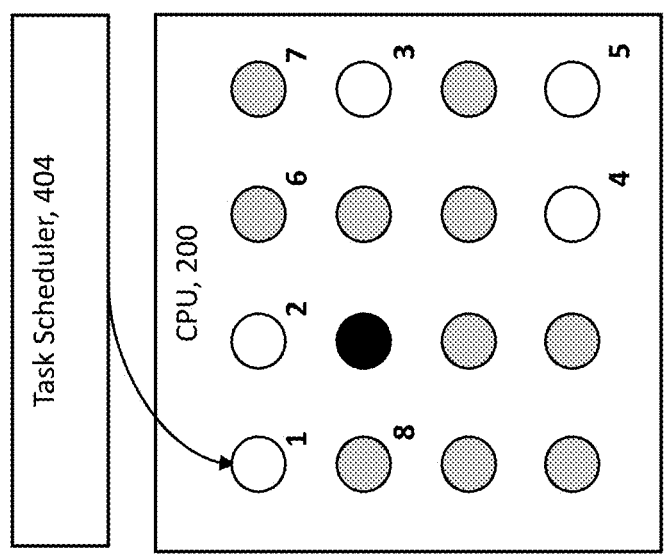
FIG. 4 illustrates an example of thermal-aware and non-spatial task placement.
Figure 5:
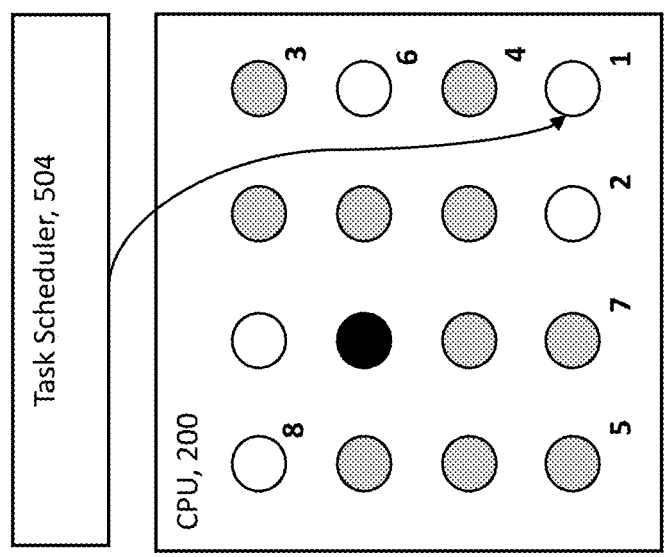
FIG. 5 illustrates an example of thermal- and spatial-aware task placement according to exemplary embodiments.

FIGS. 3-5 illustrate different techniques for task placement. In each of FIGS. 3-5, the cores of CPU 200 are shaded differently. The unshaded cores indicates cores that have a relatively low temperature as compared to the other cores (e.g. 70° F.); the light shaded cores refer to cores that are at a higher temperature than the unshaded cores (e.g. 75° F.), but less than the darkest shaded core (e.g. 80° F.). The dark shaded core may be referred to as a hotspot core. Also, in FIGS. 3-5, the number below each core represents the order the tasks are placed according to the respective task placement technique.

Referring first to FIG. 3, this figure shows a task scheduler 304 utilizing non-thermal- and non-spatial-aware task placement for CPU 200. The task scheduler 304 uses a 'round-robin' technique which does not take into account physical location of the cores or the temperature of the cores. As can be seen, the task scheduler 304 places tasks on subsequently numbered cores (i.e. task 1 on core 1, task 2 on core 2, etc.). It is noted that task 6 is placed on a hot spot which will likely result in the temperature of core 6 to rise and/or the temperature of core 7 to remain higher than the other cores.

Referring now to FIG. 4, this figure shows a task scheduler 404 using a thermal- and non-spatial-aware task placement algorithm to place tasks on respective cores of the CPU. In this example, task scheduler 404 places the tasks according to the temperature of the cores (i.e. task 1 is placed on the core with the lowest temperature, task 2 is placed on the core with the next lowest temperature, etc.). Note that task scheduler 404 does not account for the physical location of the cores; only the temperature. In this example, a task is not placed on the hotspot core, but four of the tasks (tasks 1, 2, 6, 8) are placed on cores surrounding the hotspot core.

Referring now to FIG. 5, this figure shows a task scheduler 504 using a task scheduling algorithm that is both thermal-aware and spatial-aware. In this example, a task is placed on a core where the temperature is lowest and the distance (i.e. Euclidean distance) to the hotspot core is farthest based on a placement metric. For example, the task scheduler 504 may place tasks on a core having the highest task placement metric value first, and place a subsequent task on the core with the next highest placement metric value. It can be seen from the example in FIG. 5, that the task scheduler 504 scheduler schedules tasks 1-8 in such a way that no task is placed on the hotspot core and that only one task is placed on a surrounding hotspot core which is an unshaded core.

According to exemplary embodiments, the placement metric is represented as vector, M, where each element of the vector corresponds to one core of the CPU. The placement metric may be calculated according to the following equation:

$$M = \Sigma_{i=1}^{h}(c * D_i^n + T_i) \quad (1)$$

In equation (1), h is the number of hotspot cores, $D^n$ is a distance vector where n is a number>0, T is a temperature difference vector, and c is a coefficient. The number, n, represents the degree of thermal impact and relates to the thermal conduction of the hardware (e.g. the central processing unit). For example, n may be equal to 2 for typical hardware having normal thermal conduction. However, n may be greater than 2 if the thermal conduction of the hardware is higher. Accordingly, as n increases a higher preference is given for task placement to cores farther away from the hotspot core (or the set of hotspot cores). The n may be user-defined or based on the system architecture. The coefficient c may be a scalar value, an array, or a vector that is also hardware dependent. The number of hotspot cores, h, may be predefined, e.g., by a user, or dependent the total number of cores of the CPU. For example, it may be useful to define h to be a larger number if the number of cores of the CPU is large. The vector D includes distance information; more specifically D includes the distances between the hotspot core and all other cores. For example, the distance information may be the distance between the center of hotspot core to the center of all other cores. The vector T contains the temperature difference between the hotspot core and all other cores. For the case there is more than one hotpot then it should be understood that $D_1$ and $T_1$ refer to the arrays associated with the first hotspot core, and $D_i$ and $T_i$ refer to the arrays associated with the i-th hotspot core. In certain embodiments, the temperature array, T, is updated whenever a new task arrives to be scheduled.

The task scheduler may schedule a next task according to the following equation:

$$n = \mathrm{argmax}(M) \quad (2)$$

In equation (2), n is the core where M is maximum. Accordingly, the tasks are distributed in such a way as to reduce peak temperature.

FIG. 6 shows a specific example of the temperature vector, T, and distance vector, D used to calculate the placement metric. In this example, core 6 is the only hotspot core, and thus vector T and vector D have values of zero at the vector elements corresponding to core 6. The values of the vector elements corresponding to each of the other cores are relative to the hotspot core. According to some embodiments described herein, temperature information and distance information may also be represented as an array instead of a vector. In some embodiments the distance information for each core may be predefined and stored in memory so that when a given core is determined to be a hotspot core the corresponding distance array may be retrieved from the memory.

Figure 7:
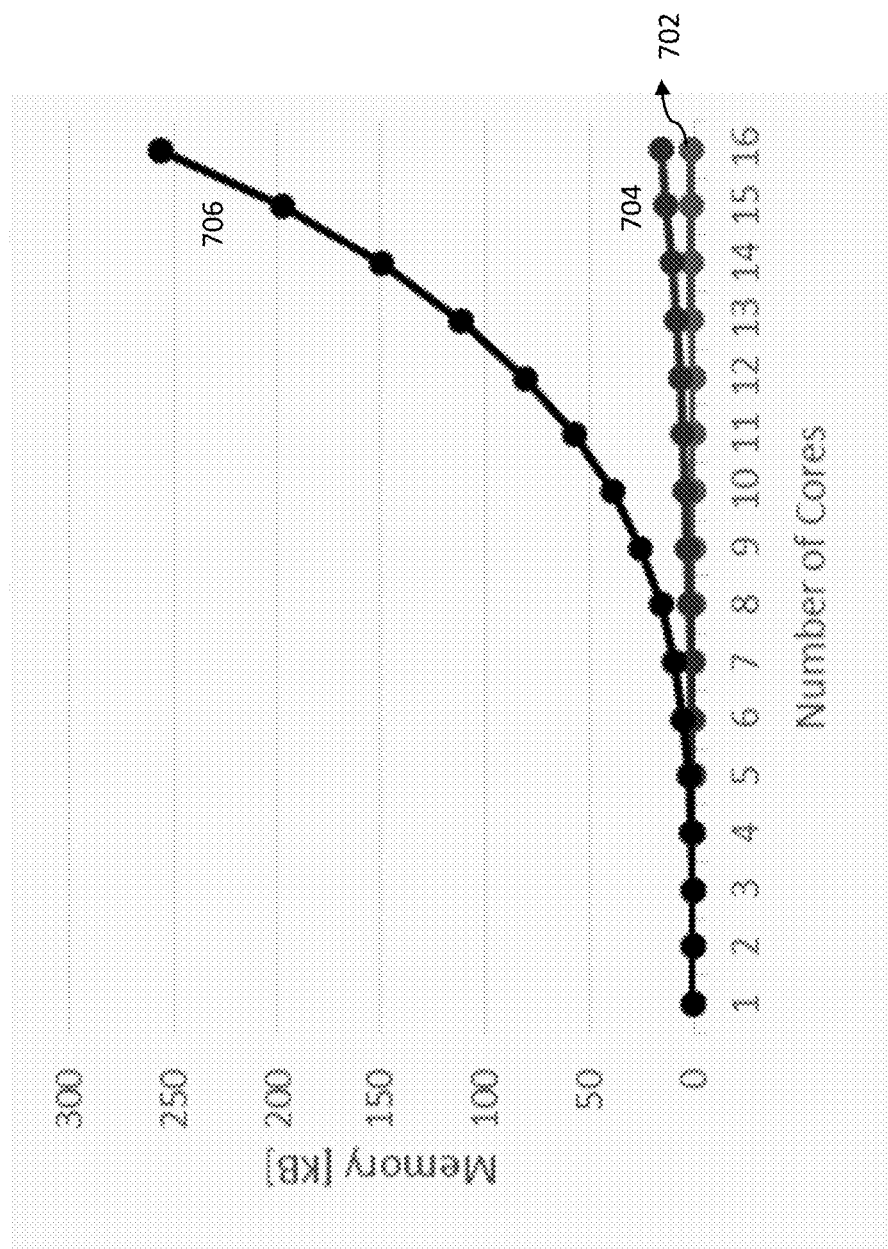
FIG. 7 illustrates a graph of required memory size comparing an exemplary embodiment to other techniques of task placement.

FIG. 7 shows a graph comparing an exemplary embodiment of task scheduling as described above to a proximity heating matrix based approach to task scheduling. A proximity heating matrix approach is a profiling-based approach based on software task. One such profiling approach is describe in co-owned U.S. Pat. No. 7,886,172 which relates to a method of virtualization and OS-level thermal management and multithreaded processor with virtualization and OS-level thermal management. The graph shown in FIG. 7 shows the required memory size in relation to the number of corresponding cores. Lines 704, 706 show data relating to the profiling-based approach described in U.S. Pat. No. 7,886,172 for one task and two tasks, respectively. Line 702 shows data relating to the exemplary embodiments of thermal- and spatial-aware task scheduling as described herein. It can be seen from FIG. 7 the thermal- and spatial-aware task scheduling requires far less memory than the proximity heating matrix approach, which increases exponentially as the number of cores and tasks increase.

Figure 8:
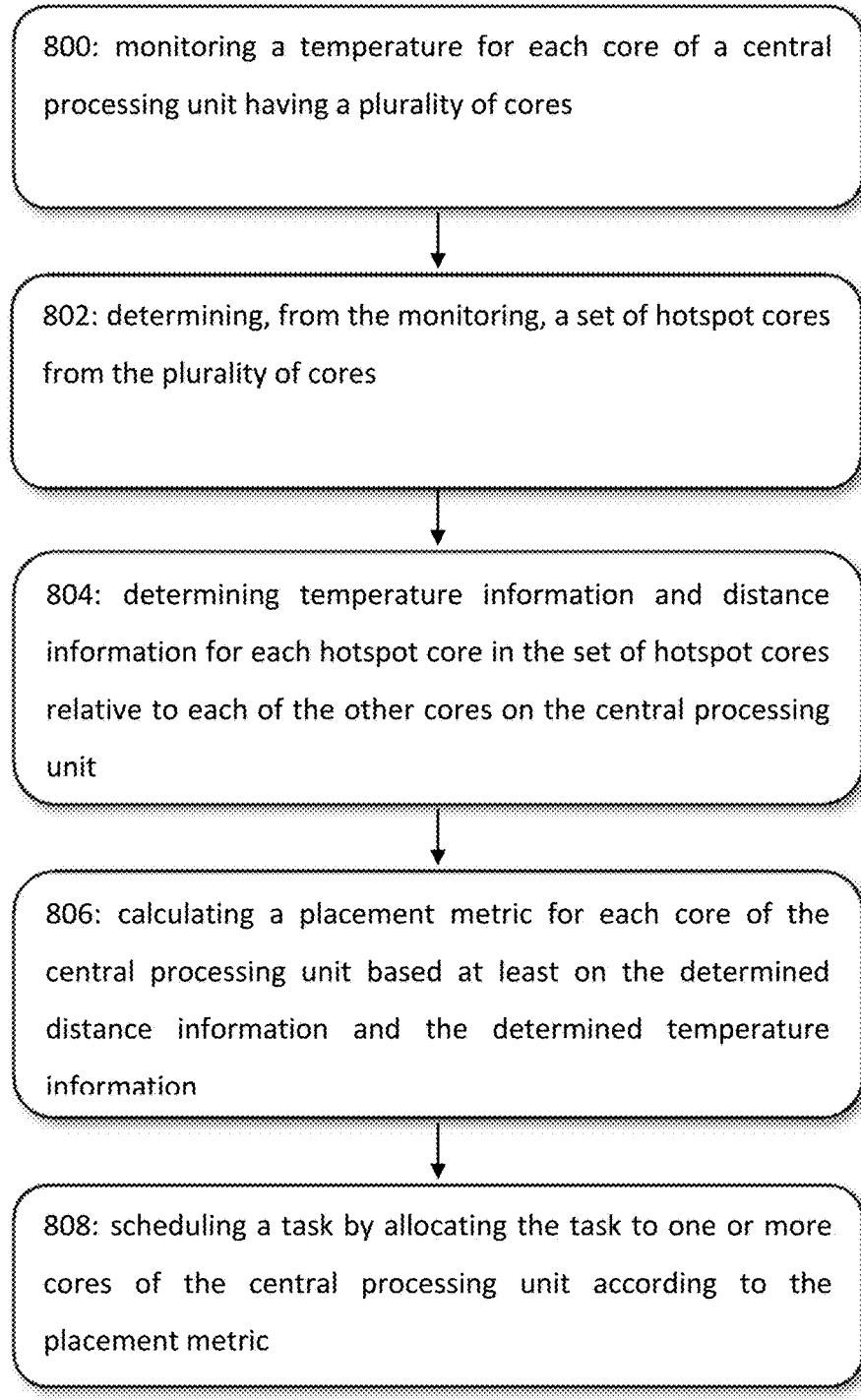
FIG. 8 is a logic flow diagram for thermal- and spatial-aware task placement, and illustrates the operation of an exemplary method, a result of execution of computer program instructions embodied on a computer readable memory, functions performed by logic implemented in hardware, and/or interconnected means for performing functions in accordance with exemplary embodiments.

FIG. 8 is a logic flow diagram for thermal- and spatial-aware task scheduling. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the task scheduler module 116 may include multiple ones of the blocks in FIG. 8, where each included block is an interconnected means for performing the function in the block. The blocks in FIG. 8 are assumed to be performed by the computer system 100, e.g., under control of the task scheduling module 116 at least in part.

Referring to FIG. 8, an example method may comprise monitoring a temperature for each core of a central processing unit having a plurality of cores as indicated by block 800; determining, from the monitoring, a set of hotspot cores from the plurality of cores as indicated by block 802; determining temperature information and distance information for each hotspot core in the set of hotspot cores relative to each of the other cores on the central processing unit as indicated by block 804; calculating a placement metric for each core of the central processing unit based at least on the determined distance information and the determined temperature information as indicated by block 806; and scheduling a task by allocating the task to one or more cores of the central processing unit according to the placement metric as indicated by block 808.

The temperature information may comprise a temperature vector, T, for each hotspot core in the set of hotspot cores and wherein the distance information may comprise a distance vector, D, for each hotspot core in the set of hotspot cores. Each temperature vector may comprise temperature values indicative of a difference in temperature between a given hotspot core in the set of hotspot cores and each of the other cores of the central processing unit, and each distance vector may comprise distance values indicative of a distance between a given hotspot core in the set of hotspot cores and each of the other cores of the central processing unit. The calculating the placement metric may be further based on a platform dependent coefficient, c, indicative of heat conduction of the central processing unit. The number of hotspot cores in the set of hotspot cores, h, may be user defined, and the placement metric may be calculated by: $\Sigma_{i=1}^{h}(c*D_i^n+T_i)$, such that n is a number greater than zero. The platform dependent coefficient may be at least one of: a scaler value and a vector. Each distance vector may be predefined based on the architecture of the central processing unit. The temperature information may be updated in response to arrival of a task to be scheduled. Each hotspot core in the set of hotspot cores may be at least one of: a core having the highest monitored temperature; a core having a monitored temperature that is higher than adjacent cores; and a core having a monitored temperature higher than a predefined threshold temperature.

An example embodiment may be provided in an apparatus, for example computer system 100 of FIG. 1. The apparatus may comprise: at least one processor; and at least one non-transitory memory including computer program code; the at least one memory and the computer program code may be configured to, with the at least one processor, cause the apparatus to: monitor a temperature for each core of a central processing unit having a plurality of cores; determine, from the monitoring, a set of hotspot cores from the plurality of cores; determine temperature information and distance information for each respective hotspot core in the set of hotspot cores relative to each of the other cores on the central processing unit; calculate a placement metric for each core of the central processing unit based at least on the determined distance information and the determined temperature information; and schedule a task by allocating the task to one or more cores of the central processing unit according to the placement metric.

The temperature information may be a temperature vector, T, for each hotspot core in the set of hotspot cores and wherein the distance information comprises a distance vector, D, for each hotspot core in the set of hotspot cores. Each temperature vector may be temperature values indicative of a difference in temperature between a given hotspot core in the set of hotspot cores and each of the other cores of the central processing unit, and each distance vector may be distance values indicative of a distance between a given hotspot core in the set of hotspot cores and each of the other cores of the central processing unit. The calculating the placement metric may be further based on a platform dependent coefficient, c, indicative of heat conduction of the central processing unit. The number of hotspot cores in the set of hotspot cores, h, may be user defined, and wherein the placement metric may be calculated by: $\Sigma_{i=1}^{h}(c*D_i^n+T_i)$, such that n is a number greater than zero. The platform dependent coefficient may be at least one of: a scaler value and a vector. Each distance vector may be predefined based on the architecture of the central processing unit. The temperature information may be updated in response to arrival of a task to be scheduled. Each hotspot core in the set of hotspot cores may be at least one of: a core having the highest monitored temperature; a core having a monitored temperature that is higher than adjacent cores; and a core having a monitored temperature higher than a predefined threshold temperature.

An example embodiment may be provided in a computer program product for scheduling tasks. The computer program product may comprise a computer readable storage medium having program instructions embodied therewith, the program instructions executable by a device to cause the device to: monitor a temperature for each core of a central processing unit having a plurality of cores; determine, from the monitoring, a set of hotspot cores from the plurality of cores; determine temperature information and distance information for each respective hotspot core in the set of hotspot cores relative to each of the other cores on the central processing unit; calculate a placement metric for each core of the central processing unit based at least on the determined distance information and the determined temperature information; and schedule a task by allocating the task to one or more cores of the central processing unit according to the placement metric.

The temperature information may be a temperature vector, T, for each hotspot core in the set of hotspot cores and wherein the distance information comprises a distance vector, D, for each hotspot core in the set of hotspot cores.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is also noted herein that while the above describes example embodiments of the invention, these descriptions should not be viewed in a limiting sense. Rather, there are several variations and modifications which may be made without departing from the scope of the present invention.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
monitoring a temperature for each core of a central processing unit having a plurality of cores;
determining, from the monitoring, a set of hotspot cores from the plurality of cores;
determining temperature information and distance information for each hotspot core in the set of hotspot cores relative to each of the other cores on the central processing unit;
calculating a placement metric for each core of the central processing unit based at least on the determined distance information and the determined temperature information; and
scheduling a task by allocating the task to one or more cores of the central processing unit according to the placement metric;
wherein the temperature information comprises a temperature vector, T, for each hotspot core in the set of hotspot cores and wherein the distance information comprises a distance vector, D, for each hotspot core in the set of hotspot cores, wherein calculating the placement metric is based on a platform dependent coefficient, c, indicative of heat conduction of the central processing unit, and wherein the number of hotspot cores in the set of hotspot cores, h, is user defined, and the placement metric is calculated by:

$\Sigma_{i=1}^{h}(c*D_i^n+T_i)$, where n is a number greater than zero whose value is related to a thermal conduction of at least the central processing unit.

2. The method of claim 1, wherein each temperature vector comprises temperature values indicative of a difference in temperature between a given hotspot core in the set of hotspot cores and each of the other cores of the central processing unit, and wherein each distance vector comprises distance values indicative of a distance between a given hotspot core in the set of hotspot cores and each of the other cores of the central processing unit.

3. The method of claim 1, wherein the platform dependent coefficient is at least one of: a scaler value and a vector.

4. The method of claim 2, wherein each distance vector is predefined based on an architecture of the central processing unit.

5. The method of claim 1, wherein the temperature information is updated in response to arrival of a task to be scheduled.

6. The method according to claim 1, wherein each hotspot core in the set of hotspot cores comprises at least one of:
a core having the highest monitored temperature;
a core having a monitored temperature that is higher than adjacent cores; and
a core having a monitored temperature higher than a predefined threshold temperature.

7. An apparatus comprising:
at least one processor; and
at least one non-transitory memory including computer program code;
the at least one memory and the computer program code may be configured to, with the at least one processor, cause the apparatus to:
monitor a temperature for each core of a central processing unit having a plurality of cores;
determine, from the monitoring, a set of hotspot cores from the plurality of cores;
determine temperature information and distance information for each respective hotspot core in the set of hotspot cores relative to each of the other cores on the central processing unit;
calculate a placement metric for each core of the central processing unit based at least on the determined distance information and the determined temperature information; and
schedule a task by allocating the task to one or more cores of the central processing unit according to the placement metric;
wherein the temperature information comprises a temperature vector, T, for each hotspot core in the set of hotspot cores and wherein the distance information comprises a distance vector, D, for each hotspot core in the set of hotspot cores, wherein calculation of the placement metric is based on a platform dependent coefficient, c, indicative of heat conduction of the central processing unit, and wherein the number of hotspot cores in the set of hotspot cores, h, is user defined, and the placement metric is calculated by:
$\Sigma_{i=1}^{h}(c*D_i^n+T_i)$, where n is a number greater than zero whose value is related to a thermal conduction of at least the central processing unit.

8. The apparatus of claim 7, wherein each temperature vector comprises temperature values indicative of a difference in temperature between a given hotspot core in the set of hotspot cores and each of the other cores of the central processing unit, and wherein each distance vector comprises distance values indicative of a distance between a given hotspot core in the set of hotspot cores and each of the other cores of the central processing unit.

9. The apparatus of claim 7, wherein the platform dependent coefficient is at least one of: a scaler value and a vector.

10. The apparatus of claim 8, wherein each distance vector is predefined based on an architecture of the central processing unit.

11. The apparatus of claim 7, wherein the temperature information is updated in response to arrival of a task to be scheduled.

12. The apparatus according to claim 7, wherein each hotspot core in the set of hotspot cores comprises at least one of:
a core having the highest monitored temperature;
a core having a monitored temperature that is higher than adjacent cores; and
a core having a monitored temperature higher than a predefined threshold temperature.

13. A computer program product for scheduling tasks, the computer program product comprising a computer readable storage medium having program instructions embodied therewith, the program instructions executable by a device to cause the device to:
monitor a temperature for each core of a central processing unit having a plurality of cores;
determine, from the monitoring, a set of hotspot cores from the plurality of cores;
determine temperature information and distance information for each respective hotspot core in the set of hotspot cores relative to each of the other cores on the central processing unit;
calculate a placement metric for each core of the central processing unit based at least on the determined distance information and the determined temperature information; and
schedule a task by allocating the task to one or more cores of the central processing unit according to the placement metric,
wherein the temperature information comprises a temperature vector, T, for each hotspot core in the set of hotspot cores and wherein the distance information comprises a distance vector, D, for each hotspot core in the set of hotspot cores, wherein calculation of the placement metric is based on a platform dependent coefficient, c, indicative of heat conduction of the central processing unit, and wherein the number of hotspot cores in the set of hotspot cores, h, is user defined, and the placement metric is calculated by:
$\Sigma_{i=1}^{h}(c*D_i^n+T_i)$, where n is a number greater than zero whose value is related to a thermal conduction of at least the central processing unit.

14. The computer program product of claim 13, wherein each temperature vector comprises temperature values indicative of a difference in temperature between a given hotspot core in the set of hotspot cores and each of the other cores of the central processing unit, and wherein each distance vector comprises distance values indicative of a distance between a given hotspot core in the set of hotspot cores and each of the other cores of the central processing unit.

15. The computer program product of claim 14, wherein each distance vector is predefined based on an architecture of the central processing unit.

16. The computer program product of claim 13, wherein the platform dependent coefficient is at least one of: a scaler value and a vector.

17. The computer program product of claim 13, wherein the temperature information is updated in response to arrival of a task to be scheduled.

18. The computer program product of claim 13, wherein each hotspot core in the set of hotspot cores comprises at least one of:
- a core having the highest monitored temperature;
- a core having a monitored temperature that is higher than adjacent cores; and
- a core having a monitored temperature higher than a predefined threshold temperature.

\* \* \* \* \*